United States Patent
Lee et al.

(10) Patent No.: US 11,947,631 B2
(45) Date of Patent: Apr. 2, 2024

(54) REVERSE IMAGE SEARCH BASED ON DEEP NEURAL NETWORK (DNN) MODEL AND IMAGE-FEATURE DETECTION MODEL

(71) Applicant: SONY GROUP CORPORATION, Tokyo (JP)

(72) Inventors: Jong Hwa Lee, San Diego, CA (US); Praggya Garg, Rancho Santa Fe, CA (US)

(73) Assignee: SONY GROUP CORPORATION, Tokyo (JP)

( * ) Notice: Subject to any disclaimer, the term of this patent is extended or adjusted under 35 U.S.C. 154(b) by 204 days.

(21) Appl. No.: 17/482,290

(22) Filed: Sep. 22, 2021

(65) Prior Publication Data

US 2022/0374647 A1 Nov. 24, 2022

Related U.S. Application Data

(60) Provisional application No. 63/189,956, filed on May 18, 2021.

(51) Int. Cl.
*G06K 9/00* (2022.01)
*G06F 3/14* (2006.01)
(Continued)

(52) U.S. Cl.
CPC .............. *G06F 18/22* (2023.01); *G06F 3/14* (2013.01); *G06F 18/2431* (2023.01);
(Continued)

(58) Field of Classification Search
CPC ........ G06F 18/22; G06F 3/14; G06F 18/2431; G06F 18/253; G06F 18/40; G06F 16/532;
(Continued)

(56) References Cited

U.S. PATENT DOCUMENTS

| 11,403,697 | B1* | 8/2022 | Wu | G06F 3/04812 |
| 2019/0156395 | A1* | 5/2019 | Bessega | G06F 16/00 |
| 2022/0157048 | A1* | 5/2022 | Ting | G06T 19/20 |

FOREIGN PATENT DOCUMENTS

| CN | 105631037 A | 6/2016 |
| CN | 107368614 B | 7/2020 |
| WO | 2020/181793 A1 | 9/2020 |

OTHER PUBLICATIONS

Mehmood A et al:"Coral classification with hybrid feature representations", 2016 IEEE International Conference on Image Processing( ICIP), IEEE,Sep. 25, 2016, pp. 519-523.
(Continued)

*Primary Examiner* — Dhaval V Patel
(74) *Attorney, Agent, or Firm* — CHIP LAW GROUP

(57) ABSTRACT

An electronic device and method for reverse image search is provided. The electronic device receives an image. The electronic device extracts, by a DNN model, a first set of image features associated with the image and generates a first feature vector based on the first set of image features. The electronic device extracts, by an image-feature detection model, a second set of image features associated with the image and generates a second feature vector based on the second set of image features. The electronic device generates a third feature vector based on combination of the first and second feature vectors. The electronic device determines a similarity metric between the third feature vector and a fourth feature vector of each of a set of pre-stored images and identifies a pre-stored image based on the similarity metric. The electronic device controls a display device to display information associated with the pre-stored image.

20 Claims, 4 Drawing Sheets

(51) Int. Cl.
    *G06F 18/22*       (2023.01)
    *G06F 18/2431*    (2023.01)
    *G06F 18/25*       (2023.01)
    *G06F 18/40*       (2023.01)
    *G06N 3/04*        (2023.01)
    *G06N 3/08*        (2023.01)
    *G06T 7/00*        (2017.01)
    *G06V 10/40*       (2022.01)
    *G06V 20/40*       (2022.01)

(52) U.S. Cl.
    CPC ............ *G06F 18/253* (2023.01); *G06F 18/40* (2023.01); *G06N 3/04* (2013.01); *G06N 3/08* (2013.01); *G06T 7/0002* (2013.01); *G06V 10/40* (2022.01); *G06V 20/46* (2022.01); *G06T 2207/10016* (2013.01); *G06T 2207/20084* (2013.01); *G06T 2207/30168* (2013.01)

(58) Field of Classification Search
    CPC .......... G06N 3/04; G06N 3/08; G06N 3/0464; G06N 3/09; G06T 7/0002; G06T 2207/10016; G06T 2207/20084; G06T 2207/30168; G06V 10/40; G06V 20/46; G06V 10/46; G06V 10/82
    See application file for complete search history.

(56) References Cited

OTHER PUBLICATIONS

Ouni Achref et al: "Leveraging Semantic Segmentation for Hybrid Image Retrieval Methods", May 15, 2021, pp. 1-19.
"Reverse image search", Wikipedia, the free encyclopedia, Aug. 4, 2021, 07 pages.
"Scale-invariant feature transform", Wikipedia, the free encyclopedia, Sep. 11, 2021, 16 pages.
Pratamamia Agung Prihatmaja, "Reverse Image Search Using Pretrained Deep Learning Model", medium.com, Nov. 10, 2019, 1 page.
"ImageNet", Imagenet.org, URL: https://www.image-net.org/, Mar. 11, 2021, 1 page.

\* cited by examiner

REVERSE IMAGE SEARCH BASED ON DEEP NEURAL NETWORK (DNN) MODEL AND IMAGE-FEATURE DETECTION MODEL

REFERENCE

This application claims priority to U.S. Provisional Patent Application Ser. No. 63/189,956 filed on May 18, 2021, the entire content of which is hereby incorporated herein by reference.

FIELD

Various embodiments of the disclosure relate to reverse image search. More specifically, various embodiments of the disclosure relate to an electronic device and method for reverse image search based on a deep neural network (DNN) model and an image-feature detection model.

BACKGROUND

Advancements in the information and communication technologies have led to development of various internet-based image search systems (for example, web search engines). Conventionally, a user may upload an input image on a web search engine as a search query. In such case, the web search engine (using reverse image search methods) may provide a set of output images from the internet. The set of output images may be similar to the input image. Such reverse image search methods may employ a machine learning model to determine the set of output images similar to the input image. In certain cases, the machine learning model may mis-classify one or more objects in the input image, which may result into the set of output images including unwanted or unrelated images.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for reverse image search based on deep neural network (DNN) model and image-feature detection model is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
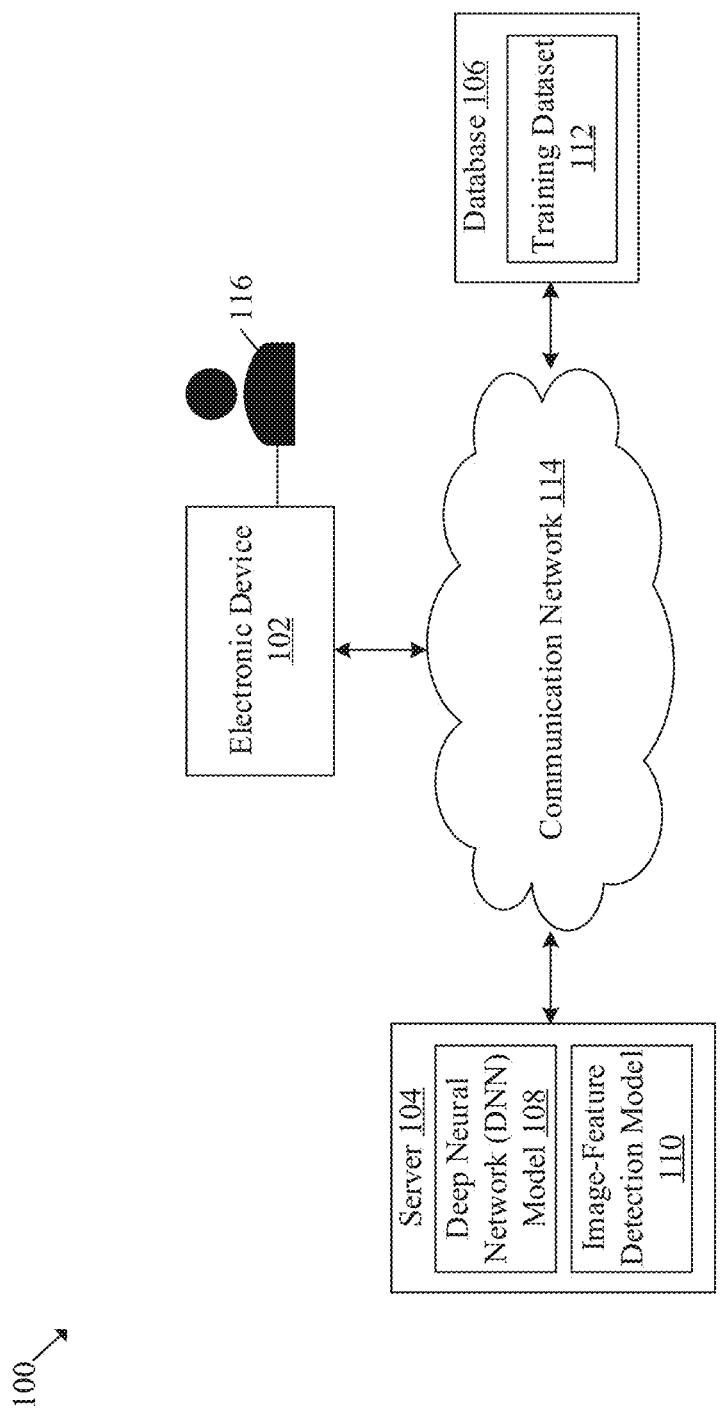
FIG. 1 is a block diagram that illustrates an exemplary network environment for reverse image search based on deep neural network (DNN) model and image-feature detection model, in accordance with an embodiment of the disclosure.

The following described implementations may be found in the disclosed electronic device and method for reverse image search based on a deep neural network (DNN) model and an image-feature detection model to enhance accuracy for the reverse image search. Exemplary aspects of the disclosure provide an electronic device which implements a deep neural network (DNN) model and an image-feature detection model for reverse image search. The electronic device may receive a first image (such as, an image for which a user needs to search similar images). The electronic device may extract, by a Deep Neural Network (DNN) model, a first set of image features associated with the received first image, and generate a first feature vector associated with the received first image based on the extracted first set of image features. The electronic device may extract, by an image-feature detection model, a second set of image features associated with the received first image, and generate a second feature vector associated with the received first image based on the extracted second set of image features. Examples of the image-feature detection model may include, but are not limited to, a Scale-Invariant Feature Transform (SIFT)-based model, a Speeded-Up Robust Features (SURF)-based model, an Oriented FAST and Rotated BRIEF (ORB)-based model, or a Fast Library for Approximate Nearest Neighbors (FLANN)-based model. The image-feature detection model may be able to extract those image features, some of which may be mis-detected and/or mis classified by the DNN model 108.

The electronic device may further generate a third feature vector associated with the received first image based on a combination of the generated first feature vector and the generated second feature vector. In an example, the generation of the third feature vector may be further based on an application of a Principal Component Analysis (PCA) transformation on the combination of the generated first feature vector and the generated second feature vector. The electronic device may further determine a similarity metric between the generated third feature vector associated with the received first image and a fourth feature vector of each of a set of pre-stored second images (such as, images stored in the database). Examples of the similarity metric may include, but not limited to a cosine-distance similarity or a Euclidean-distance similarity. The electronic device may further identify a pre-stored third image (such as a same or similar image to the received first image) from the set of pre-stored second images based on the determined similarity metric, and control a display device to display information associated with the identified pre-stored third image.

The disclosed electronic device may automatically generate the third feature vector associated with the received first image based on a combination of the generated first feature vector and the generated second feature vector. The third feature vector may thereby include the first set of image features, which may be determined by the DNN model, and the second set of image features, which may be determined by the image-feature detection model. The first set of image features may include higher-level image features (e.g., facial features such as, eyes, nose, ears, and hair) and the second set of image features may include lower-level image features (e.g., edges, lines, and contours of a face) associated with the received first image. The inclusion of both the higher-level image features and the lower-level image features in the third feature vector may complement each other for the identification of similar images. For example, in case the received first image is an image which is not adequately represented in a training dataset of the DNN model, the first set of image features may not be sufficient to identify an image similar to the received first image from the set of pre-stored second images. However, as the second set of image features may include the lower-level image features associated with the received first image, the inclusion of the second set of image features in the third feature vector may improve the accuracy of the identification of images similar to the received first image from the set of pre-stored second images. On the other hand, in case a quality of the image is not good, (for example, in case of low resolution and blurred images), the first set of image features (i.e., the higher-level image features) may not be sufficient to identify a similar image. In such case, the second set of image features (i.e., the lower-level image features) may be more useful and accurate for the identification of the similar images.

FIG. 1 is a block diagram that illustrates an exemplary network environment for reverse image search based on deep neural network (DNN) model and image-feature detection model, in accordance with an embodiment of the disclosure. With reference to FIG. 1, there is shown a network environment 100. The network environment 100 may include an electronic device 102, a server 104, and a database 106. There is further shown a Deep Neural Network (DNN) model 108, and an image-feature detection model 110 implemented on the server 104. As shown in FIG. 1, a training dataset 112 may be stored on the database 106. The electronic device 102, the server 104, and the database 106 may be communicatively coupled with each other, via a communication network 114. There is further shown a user 116 associated with the electronic device 102. In FIG. 1, the electronic device 102 and the server 104 are shown as two separate devices; however, in some embodiments, the entire functionality of the server 104 may be incorporated in the electronic device 102, without a deviation from the scope of the disclosure.

The electronic device 102 may include suitable logic, circuitry, interfaces, and/or code that may be configured to identify and display a set of images similar to a first image based on implementation of the DNN model 108 and the image-feature detection model 110 on the first image. Examples of the electronic device 102 may include, but are not limited to, an image search engine, a server, a personal computer, a laptop, a computer workstation, a mainframe machine, a gaming device, a Virtual Reality (VR)/Augmented Reality (AR)/Mixed Reality (MR) device, a smartphone, a mobile phone, a computing device, a tablet and/or any consumer electronic (CE) device.

The DNN model 108 may be a deep convolution neural network model, which may be trained on an image-feature detection task to detect a first set of image features in the first image. The DNN model 108 may be defined by its hyper-parameters, for example, activation function(s), number of weights, cost function, regularization function, input size, number of layers, and the like. The DNN model 108 may be referred to as a computational network or a system of artificial neurons (also referred to as nodes). The nodes of the DNN model 108 may be arranged in a plurality of layers, as defined in a neural network topology of the DNN model 108. The plurality of layers of the DNN model 108 may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the DNN model 108. Outputs of each hidden layer may be coupled to inputs of at least one node in other layers of the DNN model 108. Node(s) in the final layer may receive inputs from at least one hidden layer to output a result. The number of layers and the number of nodes in each layer may be determined from the hyper-parameters of the DNN model 108. Such hyper-parameters may be set before or while training the DNN model 108 on a training dataset 112.

Each node of the DNN model 108 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the DNN model 108. All or some of the nodes of the DNN model 108 may correspond to same or a different same mathematical function.

In training of the DNN model 108, one or more parameters of each node of the DNN model 108 may be updated based on whether an output of the final layer for a given input (from the training dataset) matches a correct result based on a loss function for the DNN model 108. The above process may be repeated for same or a different inputs till a minima of loss function is achieved, and a training error is minimized. Several methods for training are known in the art, for example, gradient descent, stochastic gradient descent, batch gradient descent, gradient boost, meta-heuristics, and the like.

In an embodiment, the DNN model 108 may include electronic data, which may be implemented as, for example, a software component of an application executable on the electronic device 102 or the server 104. The DNN model 108 may rely on libraries, external scripts, or other logic/instructions for execution by a processing device, such as, the electronic device 102 or the server 104. The DNN model 108 may include computer-executable codes or routines to enable a computing device, such as, the electronic device 102 or the server 104, to perform one or more operations to detect image-features in input images. Additionally, or alternatively, the DNN model 108 may be implemented using hardware including a processor, a microprocessor (e.g., to perform or control performance of one or more operations), a field-programmable gate array (FPGA), or an application-specific integrated circuit (ASIC). For example, an inference accelerator chip may be included in the electronic device 102 (or the server 104) to accelerate computations of the DNN model 108 for the image-feature detection task. In some embodiments, the DNN model 108 may be implemented using a combination of both hardware and software. Examples of the DNN model 108 may include, but are not limited to, an artificial neural network (ANN), a convolutional neural network (CNN), Regions with CNN (R-CNN), Fast R-CNN, Faster R-CNN, a You Only Look Once (YOLO) network, a Residual Neural Network (Res-Net), a Feature Pyramid Network (FPN), a Retina-Net, a Single Shot Detector (SSD), and/or a combination thereof.

The image-feature detection model 110 may be an image processing algorithm configured to extract image features associated with the first image. The image-feature detection model 110 may be defined by its hyper-parameters, for example, a number of image features, an edge threshold, a number of weights, a cost function, an input size, a number of layers, and the like. The hyper-parameters of the image-feature detection model 110 may be tuned and the weights may be updated so as to move towards a global minima of a cost function for the image-feature detection model 110. The image-feature detection model 110 may include electronic data, which may be implemented as, for example, a software component of an application executable on the electronic device 102 or the server 104. The image-feature detection model 110 may rely on libraries, external scripts, or other logic/instructions for execution by a processing device, such as, the electronic device 102 or the server 104. The image-feature detection model 110 may include code and routines configured to enable a computing device, such as, the electronic device 102 or the server 104, to perform one or more operations such as to extract a set of image features associated with the first image. Additionally, or alternatively, the image-feature detection model 110 may be implemented using hardware including a processor, a microprocessor (e.g., to perform or control performance of one or more operations), a field-programmable gate array (FPGA), or an application-specific integrated circuit (ASIC). Alternatively, in some embodiments, the image-feature detection model 110 may be implemented using a combination of hardware and software. Examples of the image-feature detection model 110 may include, but are not limited to, a Scale-Invariant Feature Transform (SIFT)-based model, a Speeded-Up Robust Features (SURF)-based model, an Oriented FAST and Rotated BRIEF (ORB)-based model, or a Fast Library for Approximate Nearest Neighbors (FLANN)-based model.

The server 104 may include suitable logic, circuitry, interfaces, and/or code that may be configured to store the DNN model 108 and the image-feature detection model 110. The server 104 may use the DNN model 108 to generate the first feature vector associated with the first image and may use the image-feature detection model 110 to generate the second feature vector associated with the first image. The server 104 may further store a machine learning model different from the DNN model 108 and the image-feature detection model 110. The stored machine learning model may be configured to determine a first weight associated with the generated first feature vector and a second weight associated with the generated second feature vector. In an exemplary embodiment, the server 104 may be implemented as a cloud server and may execute operations through web applications, cloud applications, HTTP requests, repository operations, file transfer, and the like. Other example implementations of the server 104 may include, but are not limited to, a database server, a file server, a web server, an application server, a mainframe server, or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102 as two separate entities. In certain embodiments, the functionalities of the server 104 can be incorporated in its entirety or at least partially in the electronic device 102, without a departure from the scope of the disclosure.

The database 106 may include suitable logic, interfaces, and/or code that may be configured to store the training dataset 112 for the DNN model 108. The training dataset 112 may include a set of pre-stored training images and pre-determined tags assigned to each of the set of pre-stored training images. The pre-determined tags assigned to a certain training image may include labels corresponding to image features that may be pre-determined for the particular training image. The DNN model 108 may be pre-trained for an image-feature detection task based on the training dataset 112. In an embodiment, the database 106 may be further configured to store a set of pre-stored second images. The database 106 may be a relational or a non-relational database. Also, in some cases, the database 106 may be stored on a server (for example, the server 104), such as a cloud server or may be cached and stored on the electronic device 102. Additionally, or alternatively, the database 106 may be implemented using hardware including a processor, a microprocessor (e.g., to perform or control performance of one or more operations), a field-programmable gate array (FPGA), or an application-specific integrated circuit (ASIC). In some other instances, the database 106 may be implemented using a combination of hardware and software.

The communication network 114 may include a communication medium through which the electronic device 102, the server 104, and the database 106 may communicate with one another. Examples of the communication network 114 may include, but are not limited to, the Internet, a cloud network, a Long-Term Evolution (LTE) network, a Wireless Local Area Network (WLAN), a Local Area Network (LAN), a telephone line (POTS), and/or a Metropolitan Area Network (MAN). Various devices in the network environment 100 may be configured to connect to the communication network 114, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

In operation, the electronic device 102 may initiate a reverse image search query. In an embodiment, the reverse image search may be initiated based on a user input received via a display device (shown in FIG. 2). Upon the initiation of the reverse image search, the electronic device 102 may be configured to receive a first image as an image search query. For example, the first image may correspond to an image uploaded through an I/O device (shown in FIG. 2) of the electronic device 102 based on a user input. The first image may be associated with a static image with fixed foreground or background objects or an image extracted from a video. The electronic device 102 may be configured to extract, by the DNN model 108, a first set of image features associated with the received first image. The electronic device 102 may be configured to extract, by the image-feature detection model 110, a second set of image features associated with the received first image. The details of the first set of image features and the second set of image features are provided, for example, in FIG. 3. Examples of the image-feature detection model 110 may include, but are not limited to, a Scale-Invariant Feature Transform (SIFT)-based model, a Speeded-Up Robust Features (SURF)-based model, an Oriented FAST and Rotated BRIEF (ORB)-based model, or a Fast Library for Approximate Nearest Neighbors (FLANN)-based model.

The electronic device 102 may be further configured to generate a first feature vector associated with the received first image based on the extracted first set of image features. The electronic device 102 may be further configured to generate a second feature vector associated with the received first image based on the extracted second set of image features. The first feature vector associated with the received first image may be a vector that may include information about the first set of image features, and the second feature vector associated with the received first image may be a vector that may include information about the second set of image features. The electronic device 102 may be further configured to generate a third feature vector associated with the received first image based on a combination of the generated first feature vector and the generated second feature vector. The third feature vector may include, but is not limited to, the generated first feature vector, and the generated second feature vector. In an embodiment, the generation of the third feature vector may be further based on an application of a Principal Component Analysis (PCA) transformation on the combination of the generated first feature vector and the generated second feature vector. Details of the generation of the third feature vector are described further, for example, in FIG. 3.

The electronic device 102 may be configured to determine a similarity metric between the generated third feature vector associated with the received first image and a fourth feature vector of each of a set of pre-stored second images (such as, images stored in the database 106). Examples of the similarity metric may include, but are not limited to a cosine-distance similarity or a Euclidean-distance similarity. The electronic device 102 may be configured to identify a pre-stored third image (such as a same or similar image to the received first image) from the set of pre-stored second images based on the determined similarity metric. The electronic device 102 may be further configured to control the display device to display information associated with the identified pre-stored third image. Details of the determination of the similarity metric and the identification of the pre-stored third image are described further, for example, in FIG. 3.

Figure 2:
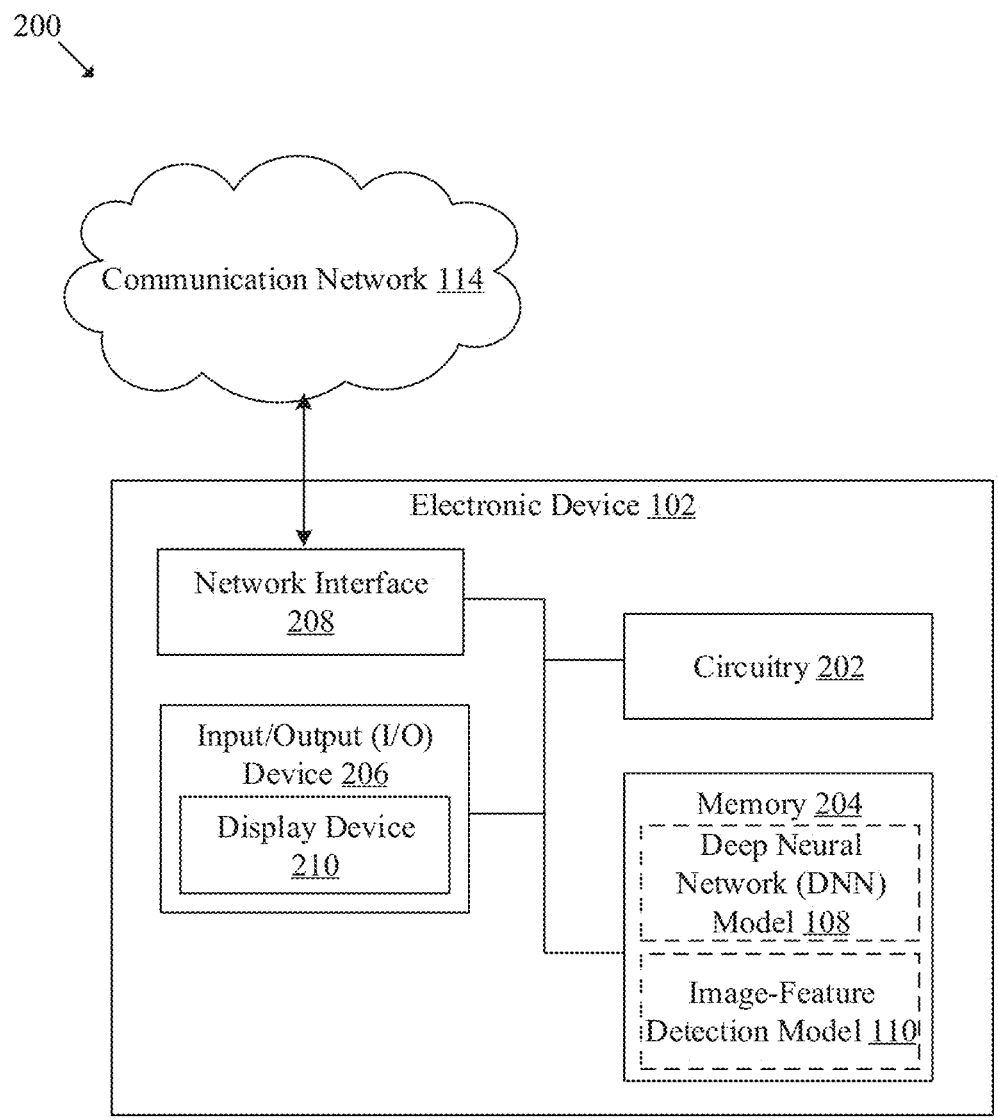
FIG. 2 is a block diagram that illustrates an exemplary electronic device for reverse image search based on deep neural network (DNN) model and image-feature detection model, in accordance with an embodiment of the disclosure.

FIG. 2 is a block diagram that illustrates an exemplary electronic device for reverse image search based on deep neural network (DNN) model and image-feature detection model, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an Input/Output (I/O) device 206, and a network interface 208. The I/O device 206 may further include a display device 210. The network interface 208 may connect the electronic device 102 with the server 104, and the database 106, via the communication network 114.

The circuitry 202 may include suitable logic, circuitry, and/or interfaces that may be configured to execute program instructions associated with different operations to be executed by the electronic device 102. The circuitry 202 may include one or more specialized processing units, which may be implemented as a separate processor. In an embodiment, the one or more specialized processing units may be implemented as an integrated processor or a cluster of processors that may be configured to perform the functions of the one or more specialized processing units, collectively. The circuitry 202 may be implemented based on a number of processor technologies that are known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store program instructions to be executed by the circuitry 202. In at least one embodiment, the memory 204 may be configured to store the DNN model 108, and the image-feature detection model 110. The memory 204 may be configured to store one or more of, but not limited to, a similarity metric, a machine learning model (e.g., a machine learning model 316 of FIG. 3) different from the DNN model 108 and the image-feature detection model 110, a first weight associated with the generated first feature vector, and a second weight associated with the generated second feature vector. In an embodiment, the memory 204 may store the first image and the identified pre-stored third image. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. The I/O device 206 may include various input and output devices, which may be configured to communicate with the circuitry 202. In an example, the electronic device 102 may receive (via the I/O device 206) a user input including a reverse image search query. The reverse image search query may include the first image. In another example, the electronic device 102 may receive (via the I/O device 206) a user input including a first weight associated with the generated first feature vector and a second weight associated with the generated second feature vector. The electronic device 102 may control the I/O device 206 to output the identified pre-stored third image. Examples of the I/O device 206 may include, but are not limited to, a touch screen, a keyboard, a mouse, a joystick, a display device (for example, the display device 210), a microphone, or a speaker.

The display device 210 may include suitable logic, circuitry, and interfaces that may be configured to display an output of the electronic device 102. The display device 210 may be utilized to display the information associated with the identified pre-stored third image. In some embodiments, the display device 210 may be an externally coupled display device associated with the electronic device 102. The display device 210 may be a touch screen, which may enable the user 116 to provide a user input via the display device 210. The touch screen may be at least one of a resistive touch screen, a capacitive touch screen, a thermal touch screen or any other touch screen using which inputs can be provided to the display device 210. The display device 210 may be realized through several known technologies such as, but not limited to, at least one of a Liquid Crystal Display (LCD)

display, a Light Emitting Diode (LED) display, a plasma display, or an Organic LED (OLED) display, or other display technologies.

The network interface 208 may include suitable logic, circuitry, interfaces, and/or code that may be configured to facilitate communication between the electronic device 102, the server 104, and the database 106, via the communication network 114. The network interface 208 may be implemented by use of various known technologies to support wired or wireless communication of the electronic device 102 with the communication network 114. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via a wired communication or a wireless communication or a combination thereof with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11 n), voice over Internet Protocol (VoIP), light fidelity (Li-Fi), Worldwide Interoperability for Microwave Access (Wi-MAX), a protocol for email, instant messaging, and a Short Message Service (SMS).

Figure 3:
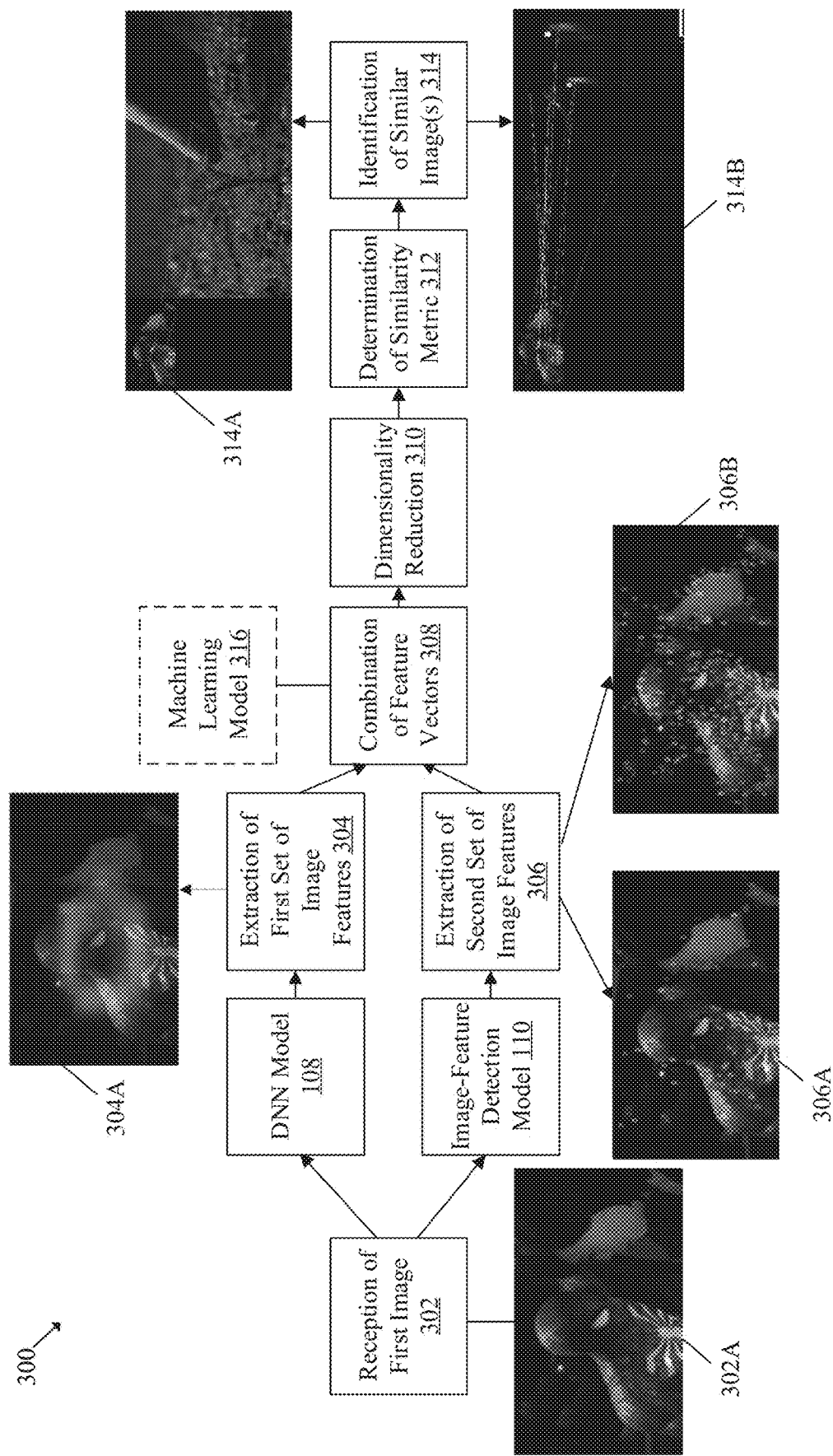
FIG. 3 is a diagram that illustrates exemplary operations for reverse image search based on deep neural network (DNN) model and image-feature detection model, in accordance with an embodiment of the disclosure.
Figure 4:
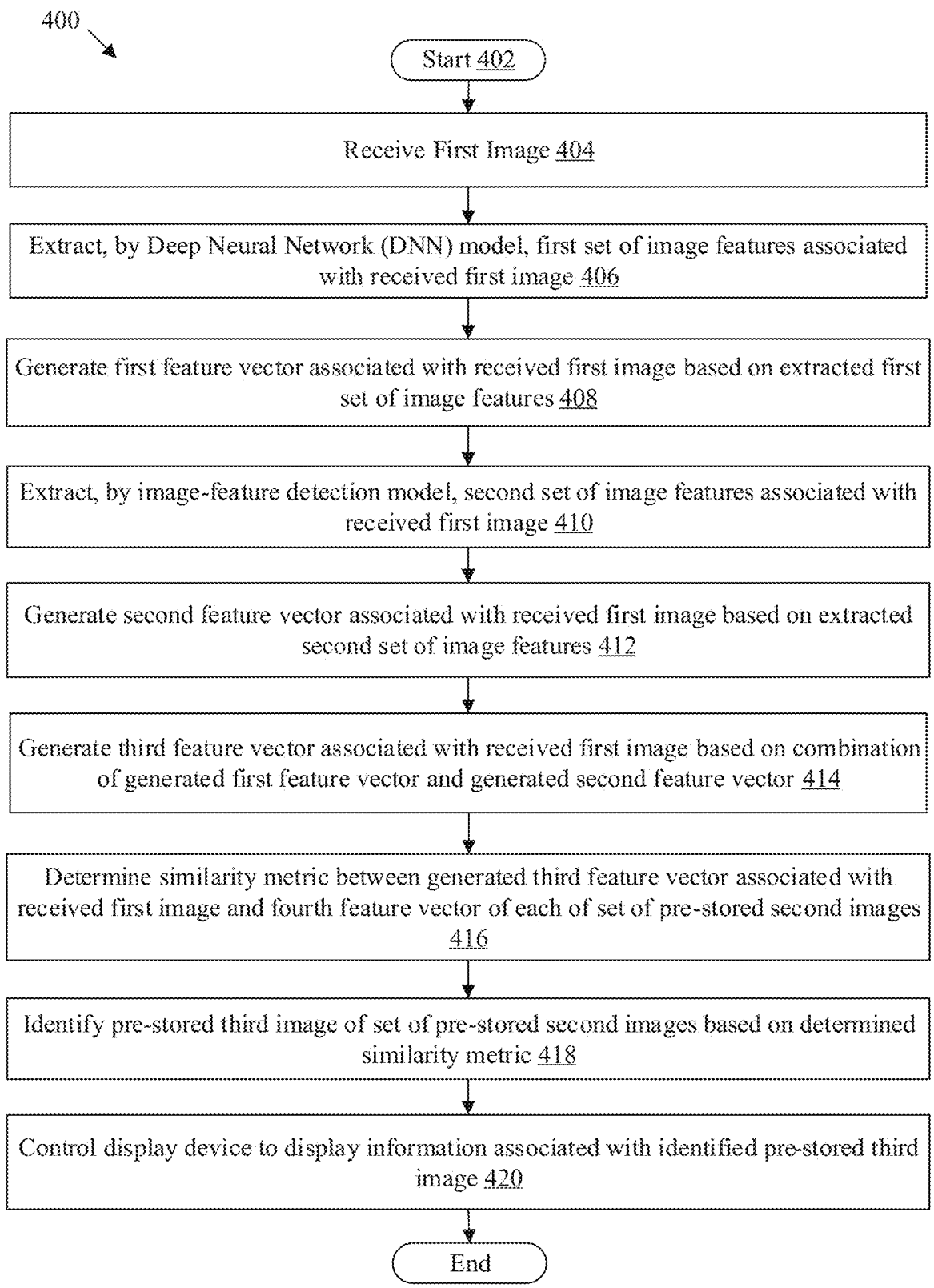
FIG. 4 is a flowchart that illustrates an exemplary method for reverse image search based on deep neural network (DNN) model and image-feature detection model, in accordance with an embodiment of the disclosure.

The operations of the circuitry 202 are further described, for example, in FIGS. 3 and 4. It may be noted that the electronic device 102 shown in FIG. 2 may include various other components or systems. The description of the other components or systems of the electronic device 102 has been omitted from the disclosure for the sake of brevity.

FIG. 3 is a diagram that illustrates exemplary operations for reverse image search based on deep neural network (DNN) model and image-feature detection model, in accordance with an embodiment of the disclosure. FIG. 3 is explained in conjunction with elements from FIG. 1 and FIG. 2. With reference to FIG. 3, there is shown a block diagram 300 that illustrates exemplary operations from 302 to 314 for reverse image search based on the DNN model 108 and the image-feature detection model 110. The exemplary operations may be executed by any computing system, for example, by the electronic device 102 of FIG. 1 or by the circuitry 202 of FIG. 2.

At 302, a first image may be received. In an embodiment, the circuitry 202 may be configured to receive the first image. For example, the first image 302A may be received. The first image 302A may be received from a data source, for example, a persistent storage (like memory 204) on the electronic device 102, an image capture device, a cloud server, or a combination thereof. The first image 302A may include an object of interest for which the user 116 may require similar or same image results using the reverse image search. Alternatively, the first image 302A may correspond to an image from a sequence of images of a first video. The circuitry 202 may be configured to extract the first image 302A from the first video. The first video may correspond to a video including an object of interest for which the user 116 requires similar or same video results using the reverse image search. The first image 302A may represent an image with fixed foreground or background. As shown, for example, the first image 302A may depicts a scene from a movie (for example an image of a spiderman as an object of interest, as shown in FIG. 3).

After the reception of the first image 302A, the circuitry 202 may input the received first image 302A to the DNN model 108 and the image-feature detection model 110 for image-feature extraction. The circuitry 202 may employ the DNN model 108 to extract a first set of image features associated with the first image 302A, as described, for example, in 304. The circuitry 202 may further employ the image-feature detection model 110 to extract a second set of image features associated with the first image 302A, as described, for example, in 306. The operations 304 and 306 may be performed in any order without deviation from the scope of the disclosure.

At 304, the first set of image features may be extracted. In an embodiment, the circuitry 202 may be configured to extract, by a Deep Neural Network (DNN) model (such as the DNN model 108), the first set of image features associated with the received first image 302A. The extracted first set of image features may correspond to unique features associated with one or more objects in the received first image 302A. The DNN model 108 may be pre-trained for an image feature extraction task based on the training dataset 112 of a set to pre-stored training images assigned with pre-determined tags. The pre-determined tags assigned to a certain training images may include labels corresponding to image features that may be pre-determined for the particular training image. The circuitry 202 may feed the DNN model 108 with the first image 302A as an input and may receive the first set of image features (i.e. associated with the first image 302A) as an output from the DNN model 108 based on the image-feature detection task executed, by the DNN model 108, on the first image 302A.

In an embodiment, the extracted first set of image features may include information which may be required to classify each of included objects in a particular object class. Examples of the extracted first set of image features may include, but are not limited to, shape, texture, color, and other high-level image features. As shown in FIG. 3, for example, the extracted first set of image features 304A associated with the first image 302A may include a color depicted as a grey shade on the object of interest (such as a face of the spiderman). For example, in case the object of interest is a face of a person, such as the spiderman or any other person/character, in the first image 302A, the first set of image features 304A may include a shape of eyes, a shape of ears, a shape of nose, and shapes/textures of other high-level facial details of the person/character. Detailed implementation of the extraction of the first set of image features, by the DNN model 108, may be known to one skilled in the art, and therefore, a detailed description of such extraction of the first set of image features has been omitted from the disclosure for the sake of brevity.

The circuitry 202 may be configured to generate a first feature vector associated with the received first image 302A based on the extracted first set of image features. Such first feature vector may also be referred as a unique set of first image features. The generated first feature vector may include a plurality of vector elements, where each vector element may correspond to an image feature from the extracted first set of image features. Each vector element of the first feature vector may store a value which may correspond to a certain first image feature from the first set of image features. For example, if the received first image 302A is a high-definition image (for example, an image of "1024×1024" pixels), then the first feature vector may be a "1×2048" vector with 2048 vector elements. An $i^{th}$ element of the first feature vector may represent a value of an $i^{th}$ first image feature.

At 306, the second set of image features may be extracted. In an embodiment, the circuitry 202 may be configured to extract, by an image-feature detection model (such as the image-feature detection model 110), the second set of image features associated with the received first image 302A. The extracted second set of image features may also correspond to certain unique features associated with the one or more objects included in the received first image 302A. In certain embodiments, the second set of image features may be image features that may be mis-detected or may remain undetected by the DNN model 108 (for example at 304). In an embodiment, the extracted second set of image features may include information which may be required to optimally classify each object (in the first image 302A) in a particular object class. Examples of the second set of image features may include, but are not limited to, edges, lines, contours, and other low-level image features. Examples of the image-feature detection model 110 may include, but are not limited to, a Scale-Invariant Feature Transform (SIFT)-based model, a Speeded-Up Robust Features (SURF)-based model, an Oriented FAST and Rotated BRIEF (ORB)-based model, or a Fast Library for Approximate Nearest Neighbors (FLANN)-based model. Detailed implementation of these example methods may be known to one skilled in the art, and therefore, a detailed description of such methods has been omitted from the disclosure for the sake of brevity. As shown in FIG. 3, for example, a second set of image features 306A associated with the first image 302A depicts the extracted second set of image features based on the SIFT based model, and a second set of image features 306B associated with the first image 302A depicts the extracted second set of image features based on the SURF based model. For example, in case the object of interest is a face of a person, such as the spiderman or any other person/character in the first image 302A, the second set of image features 306A (or the second set of image features 306B) may include edges and contours of eyes, edges and contours of ears, edges and contours of nose, and other low-level facial details of the person/character.

The circuitry 202 may be further configured to generate a second feature vector associated with the received first image 302A based on the extracted second set of image features. Such second feature vector may also be referred as a unique set of second image features. The generated second feature vector may include a plurality of vector elements, where each vector element may correspond to an image feature from the extracted second set of image features. Each vector element of the second feature vector may store a value which may correspond to a certain second image feature from the set of second image features. For example, if the received first image 302A is a high-definition image (for example, an image of "1024×1024" pixels), then the second feature vector may be a "1×2048" vector with 2048 vector elements. An $i^{th}$ element of the second feature vector may represent a value of an $i^{th}$ second image feature.

At 308, features vectors may be combined. In an embodiment, the circuitry 202 may be configured to generate a third feature vector associated with the received first image 302A based on a combination of the generated first feature vector and the generated second feature vector. In an embodiment, the circuitry 202 may be configured to automatically combine the generated first feature vector and the generated second feature vector. For example, if the received first image 302A is a high-definition image (for example, an image of "1024×1024" pixels), the first feature vector may be a "1×2048" vector with 2048 vector elements and the second feature vector may also be a "1×2048" vector with 2048 vector elements. In such case, the third feature vector may be a "1×4096" vector with 4096 vector elements.

In an embodiment, the circuitry 202 may be configured to determine, by a machine learning model 316 (i.e. different from the DNN model 108 and the image-feature detection model 110), a first weight associated with the generated first feature vector and a second weight associated with the generated second feature vector. The machine learning model 316 may be a regression model, which may be trained on sets of similar sized feature vectors, where each vector may be tagged with a user-defined weight value. The machine learning model 316 may be trained on a feature-vector weight assignment task, wherein the machine learning model 316 may receive a set of two similar sized feature vectors as input and may output weights for each of the set of two similar sized feature vectors. The machine learning model 316 may be defined by its hyper-parameters, for example, number of weights, cost function, input size, number of layers, and the like. The hyper-parameters of the machine learning model 316 may be tuned, and weights may be updated so as to move towards a global minima of a cost function for the machine learning model 316. After several epochs of the training on the feature information in the training dataset, the machine learning model 316 may be trained to output weight values for a set of inputs. The output may be indicative of a weight value for each input of the set of inputs (e.g., the first feature vector, and the second feature vector).

The machine learning model 316 may include electronic data, which may be implemented as, for example, a software component of an application executable on the electronic device 102. The machine learning model 316 may rely on libraries, external scripts, or other logic/instructions for execution by a computing device including processors, such as the circuitry 202. The machine learning model 316 may include code and routines configured to enable the computing device including the processors, such as the circuitry 202, to perform one or more operations for determination of the first weight associated with the first feature vector, and determination of the second weight associated with the second feature vector. Additionally or alternatively, the machine learning model 316 may be implemented using hardware including a processor, a microprocessor (e.g., to perform or control performance of one or more operations), a field-programmable gate array (FPGA), or an application-specific integrated circuit (ASIC). Alternatively, in some embodiments, the machine learning model 316 may be implemented using a combination of hardware and software.

Each of the first weight associated with the generated first feature vector and the second weight associated with the generated second feature vector may be indicative of a likelihood of reliability of a respective feature vector, for an identification of the object of interest in an image and thereby an identification of similar images that may include the object of interest. The first weight and the second weight may specify a confidence value for the reliability (in terms of probability values between 0 and 1). Thus, a more reliable feature vector may have a higher weight value. For example, if the received first image 302A is a high-resolution image and the extracted first set of image features are more detailed than the extracted second set of image features, then the generated first feature vector may be more reliable than the generated second feature vector. In such an example, the first weight associated with the generated first feature vector may have a higher weight value (such as, 0.6) as compared to the second weight (such as, 0.4 value) associated with the generated second feature vector. In contrast, if the received first image 302A is a low-resolution image and the extracted second set of image features are more detailed than the extracted first set of image features, then the generated second feature vector may be more reliable than the generated first feature vector. In such an example, the first weight associated with the generated first feature vector may have a lesser weight value (such as, 0.4) as compared to the second weight (such as, 0.6 value) associated with the generated second feature vector. Further if the received first image 302A is medium resolution image (e.g., a standard resolution image), then the first weight associated with the generated first feature vector may have equal weight value (such as, 0.5) as compared to the second weight (such as, 0.5 value) associated with the generated second feature vector. Based on the determined first weight and the determined second weight, the circuitry 202 may be further configured to combine the generated first feature vector and the generated second feature vector to further generate the third feature vector based on the combination.

In an embodiment, circuitry 202 may be configured to receive a user-input including the first weight associated with the generated first feature vector and including the second weight associated with the generated second feature vector. In an example, the received user-input may be indicative of the first weight associated with the generated first feature vector as "0.4", then the circuitry 202 may be configured to determine the second weight associated with the generated second feature vector as "0.6". In another example, the received user-input may be indicative of the first weight associated with the generated first feature vector as "0.5", and the second weight associated with the generated second feature vector as "0.5". Based on the received user input, the circuitry 202 may be further configured to combine the generated first feature vector and the generated second feature vector to further generate the third feature vector based on the combination.

In an embodiment, the circuitry 202 may be configured to classify, by the DNN model 108, the received first image 302A into a first image tag from a set of image tags associated with the DNN model 108. The first image tag may specify an image tag to which the received first image 302A may belong. For example, the received first image 302A may have an image tag, such as a spiderman character. The circuitry 202 may be further configured to determine a first count of images, associated with the first image tag, in a training dataset (such as the training dataset 112) associated with the DNN model 108. For example, the circuitry 202 may compare the first image tag with an image tag of a pre-stored training image from the set of pre-stored training images in the training dataset 112. If the image tag of the pre-stored training image in the training dataset 112 matches the first image tag, the circuitry 202 may increment the first count of images associated with the first image tag by one. Similarly, based on the comparison of image tags of each of the set of pre-stored training images in the training dataset 112 with the first image tag, the circuitry 202 may determine the first count of images. The circuitry 202 may be further configured to determine a first weight associated with the generated first feature vector and a second weight associated with the generated second feature vector based on the determined first count of images associated with the first image tag. For example, if the first count of images in the training dataset 112 is higher than a certain threshold (for example, a certain threshold count or a percentage of total images in the training dataset 112), then the first weight associated with the generated first feature vector may have a higher weight value as compared to the second weight associated with the generated second feature vector. In contrast, if the first count of images in the training dataset 112 is lesser than the threshold or nominal (for example, a very negligible value, such as, a few hundred images in the training dataset 112 of a million images), then the first weight associated with the generated first feature vector may have a lesser weight value as compared to the second weight associated with the generated second feature vector. Based on the determined first weight and the determined second weight, the circuitry 202 may be configured to combine the generated first feature vector and the generated second feature vector to generate the third feature vector to further generate the third feature vector based on the combination.

In an embodiment, the circuitry 202 may be configured to determine an image quality score associated with the received first image 302A based on at least one of the extracted first set of image features or the extracted second set of image features. The image quality score may indicate a qualitative value associated with a fidelity-level of the received first image 302A. A higher image quality score may indicate a higher fidelity-level of the received first image 302A. The image quality score may correspond to, but is not limited to, a sharpness, a noise, a dynamic range, a tone reproduction, a contrast, a color saturation, a distortion, a vignetting, an exposure accuracy, a chromatic aberration, a lens flare, a color moire, or artifacts associated with the received first image 302A. The sharpness may correspond to details associated with the image features associated with the received first image 302A. For example, if a pixel count or focus of the received first image 302A is high, then the sharpness of the received first image 302A may be high. The noise may correspond to a disturbance in the received first image 302A, such as an unwanted variation at a pixel level in the received first image 302A. The dynamic range may correspond to an amount of tonal difference between a lightest shade and darkest shade of light that may be captured in the received first image 302A. The tone reproduction may correspond to a correlation between the amount of light which may be captured in the received first image 302A and an amount of light to which the received first image 302A may be exposed. The contrast may correspond to an amount of color variation in the received first image 302A. The color saturation may correspond to an intensity of color in the received first image 302A. The distortion may correspond unwanted pixel change in the received first image 302A. The vignetting may correspond to blackening, a reduction of sharpness, or a reduction of saturation of the received first image 302A from corners as compared to a center of the received first image 302A. The exposure accuracy may correspond to capturing the received first image 302A with an optimal brightness. The chromatic aberration may correspond to color distortion in the received first image 302A. The lens flare may correspond to response of an image capturing device to a bright light. The color moire may correspond to repetitive color stripes that may appear in the received first image 302A. The artifacts associated with the received first image 302A may correspond to any virtual object that may be present in the received first image 302A.

The circuitry 202 may be further configured to determine a first weight associated with the generated first feature vector and a second weight associated with the generated second feature vector based on the determined image quality score. For example, if the determined image quality score is high, then the first weight associated with the generated first feature vector may be assigned a higher weight value as compared to the second weight associated with the generated second feature vector. In contrast, if the determined image quality score is less or nominal, then the first weight associated with the generated first feature vector may be assigned a lesser weight value as compared to the second weight associated with the generated second feature vector. In an embodiment, when the image quality score is above a threshold value, the determined first weight may be higher than the determined second weight. The threshold value may include, for example an image quality score of "0.4", "0.6", "0.8", and the like. In an embodiment, the circuitry 202 may be configured to receive a user input to set the threshold value for the image quality score. In another embodiment, the circuitry 202 may be configured to automatically set the threshold value for the image quality score. Based on the determined first weight and the determined second weight, the circuitry 202 may be configured to combine the generated first feature vector and the generated second feature vector. Thereafter, the circuitry 202 may be further configured to generate the third feature vector based on the combination of the generated first feature vector and the generated second feature vector.

At 310, a dimensionality may be reduced. In an embodiment, the circuitry 202 may be configured to reduce a dimensionality of the generated third feature vector. In some embodiments, the circuitry 202 may resize (or compress) the generated third feature vector to match a size of an input layer of a feature extractor and then pass the resized generated third feature vector to the input layer of the feature extractor. This may reduce unwanted or repetitive information from the generated third feature vector. The generation of the third feature vector may be further based on an application of a Principal Component Analysis (PCA) transformation on the combination of the generated first feature vector and the generated second feature vector. For example, if the generated third vector is a "1×4096" vector with 4096 vector elements, then after application of the PCA transformation, the generated third vector may be reduced to a "1×256" vector with 256 vector elements. Detailed implementation of PCA transformation may be known to one skilled in the art, and therefore, a detailed description of such transformation has been omitted from the disclosure for the sake of brevity.

At 312, a similarity metric may be determined. In an embodiment, the circuitry 202 may be configured to determine the similarity metric between the generated third feature vector associated with the received first image 302A and a fourth feature vector of each of the set of pre-stored second images. The set of pre-stored second images may be stored in the database 106. In an embodiment, the circuitry 202 may be configured to generate the fourth feature vector of each of the set of pre-stored second images. For example, the circuitry 202 may apply the DNN model 108, the image-feature detection model 110, or a combination of the both on each of the set of pre-stored second images to generate the fourth feature vector of the respective pre-stored second image. In another example, the fourth feature vector of each respective pre-stored second image may be pre-determined and pre-stored along with the respective pre-stored second image in the database 106. The similarity metric may correspond to a similarity measure to determine images, similar to the received first image 302A, from the set of pre-stored second images. In such a case, based on the determined similarity metric, the generated third feature vector associated with the received first image 302A may be compared with the fourth feature vector of each of the set of pre-stored second images in order to identify similar images. Examples of the similarity metric may include, but are not limited to, a cosine-distance similarity or a Euclidean-distance similarity. In the cosine-distance similarity, a cosine-distance may be determined between the generated third feature vector associated with the received first image 302A and the fourth feature vector of each of the set of pre-stored second images. For example, in case the fourth feature vector of a certain pre-stored second image has a small cosine-distance with respect to the generated third vector, the particular pre-stored second image may be identified as one of the images similar to the received first image 302A.

At 314, similar images may be identified. In an embodiment, the circuitry 202 may be configured to identify a pre-stored third image as a similar image from the set of pre-stored second images based on the determined similarity metric. For example, the circuitry 202 may compare the generated third feature vector associated with the received first image 302A with the fourth feature vector of each of the set of pre-stored second images, based on the similarity metric. Based on the similarity metric, if it is determined that the fourth feature vector of a certain pre-stored second image matches the generated third feature vector associated with the received first image 302A, then the circuitry 202 may identify the particular pre-stored second image as the pre-stored third image (i.e., a similar image) from the set of pre-stored second images.

The circuitry 202 may be further configured to control a display device (such as the display device 210) to display information associated with the identified pre-stored third image. The information associated with the identified pre-stored third image may include information such as, but not limited to, the pre-stored third image itself, metadata associated with the pre-stored third image, a feature map between the third feature vector and the fourth feature vector, a file-size of the pre-stored third image, a storage location associated with the pre-stored third image, or a file-download path associated with the pre-stored third image. In an embodiment, the identified pre-stored third image may correspond to a pre-stored second video. The pre-stored second video may be associated with the first video. For example, the pre-stored third image may be one of the image frames from a set of image frames in the pre-stored second video. In an embodiment, the first image 302A may be extracted from the first video. As the pre-stored third image may be associated with or similar to the received first image 302A, the pre-stored second video may be associated with or similar to the first video.

As an example shown in FIG. 3, there is shown information 314A associated with the identified pre-stored third image which may be identified based on the DNN model 108 and the image-feature detection model 110 (such as, the SIFT based model). The information 314A may include a feature map between the generated third feature vector associated with the received first image 302A and the fourth feature vector associated with the identified pre-stored third image. As an example shown in FIG. 3, there is further shown information 314B associated with the identified pre-stored third image which may be identified based on the DNN model 108 and the image-feature detection model 110 (such as, the SURF based model). The information 314B may also include a feature map between the generated third feature vector associated with the received first image 302A and the fourth feature vector associated with the identified pre-stored third image.

As discussed in the aforementioned, the disclosed electronic device 102 may automatically generate the third feature vector associated with the received first image 302A, based on the combination of the generated first feature vector and the generated second feature vector. The third feature vector may thereby include the first set of image features, which may be determined by the DNN model 108, and the second set of image features, which may be determined by the image-feature detection model 110. The first set of image features may include the higher-level image features (e.g., facial features such as, eyes, nose, ears, and hair) and the second set of image features may include the lower-level image features (e.g., points, edges, lines, contours, or elementary objects and shapes of a face) associated with the received first image 302A (for example an image of face of a person). The inclusion of both the higher-level image features and the lower-level image features in the third feature vector may complement each other for the identification of similar images. In some scenarios, it may be possible that the first set of image features may not detect and extract all features, which may be present in the received first image 302A. Herein, some features may be mis-detected or may remain undetected by the DNN model 108. For example, in case the received first image 302A is an image which is not adequately represented in the training dataset 112 of the DNN model 108, the first set of image features may not be sufficient to identify an image similar to the received first image from the set of pre-stored second images. However, as the second set of image features (i.e. determined by the image-feature detection model 110) may include the lower-level image features associated with the received first image 302A, the inclusion of the second set of image features in the third feature vector may further improve the accuracy of the identification of images similar to the received first image 302A from the set of pre-stored second images. For example, in case a quality of the image is not good, (for example, in case of low resolution and blurred images), the first set of image features (i.e., the higher-level image features) may not be sufficient to identify a similar image. In such case, the second set of image features (i.e., the lower-level image features) may be more useful and accurate for the identification of the similar images.

FIG. 4 is a flowchart that illustrates exemplary method for reverse image search based on deep neural network (DNN) model and image-feature detection model, in accordance with an embodiment of the disclosure. FIG. 4 is explained in conjunction with elements from FIGS. 1, 2, and 3. With reference to FIG. 4, there is shown a flowchart 400. The method illustrated in the flowchart 400 may be executed by any computing system, such as by the electronic device 102 or the circuitry 202. The method may start at 402 and proceed to 404.

At 404, a first image (such as, the first image 302A) may be received. In one or more embodiments, the circuitry 202 may be configured to receive the first image 302A. The reception of the first image 302A is described further, for example, in FIG. 3 (at 302).

At 406, a first set of image features (such as, the first set of image features 304A) associated with the received first image (e.g., the first image 302A) may be extracted by a Deep Neural Network (DNN) model (e.g., the DNN model 108). In one or more embodiments, the circuitry 202 may be configured to extract, by the DNN model 108, the first set of image features 304A associated with the received first image 302A. The extraction of the first set of image features 304A is described further, for example, in FIG. 3 (at 304).

At 408, a first feature vector associated with the received first image 302A may be generated, based on the extracted first set of image features 304A. In one or more embodiments, the circuitry 202 may be configured to generate the first feature vector associated with the received first image 302A, based on the extracted first set of image features 304A. The generation of the first feature vector is described further, for example, in FIG. 3 (at 304).

At 410, a second set of image features (such as, the second set of image features 306A) associated with the received first image 302A may be extracted by an image-feature detection model (e.g., the image-feature detection model 110). In one or more embodiments, the circuitry 202 may be configured to extract, by the image-feature detection model 110, the second set of image features 306A associated with the received first image 302A. In an example, the image-feature detection model 110 may include at least one of a Scale-Invariant Feature Transform (SIFT)-based model, a Speeded-Up Robust Features (SURF)-based model, an Oriented FAST and Rotated BRIEF (ORB)-based model, or a Fast Library for Approximate Nearest Neighbors (FLANN)-based model. The extraction of the second set of image features 306A is described further, for example, in FIG. 3 (at 306).

At 412, a second feature vector associated with the received first image 302A may be generated, based on the extracted second set of image features 306A. In one or more embodiments, the circuitry 202 may be configured to generate the second feature vector associated with the received first image 302A, based on the extracted second set of image features 306A. The generation of the second feature vector is described further, for example, in FIG. 3 (at 306).

At 414, a third feature vector associated with the received first image 302A may be generated, based on a combination of the generated first feature vector and the generated second feature vector. In one or more embodiments, the circuitry 202 may be configured to generate the third feature vector associated with the received first image 302A based on the combination of the generated first feature vector and the generated second feature vector. In an example, the generation of the third feature vector may be further based on an application of a Principal Component Analysis (PCA) transformation on the combination of the generated first feature vector and the generated second feature vector. The generation of the third feature vector is described further, for example, in FIG. 3 (at 308).

At 416, a similarity metric between the generated third feature vector associated with the received first image 302A and a fourth feature vector of each of a set of pre-stored second images may be determined. In one or more embodiments, the circuitry 202 may be configured to determine the similarity metric between the generated third feature vector associated with the received first image 302A and the fourth feature vector of each of the set of pre-stored second images. In an example, the similarity metric may include at least one of, but not limited to, a cosine-distance similarity or a Euclidean-distance similarity. The determination of the similarity metric is described further, for example, in FIG. 3 (at 312).

At 418, a pre-stored third image (such as, the pre-stored third image) from the set of pre-stored second images may be identified, based on the determined similarity metric. In one or more embodiments, the circuitry 202 may be configured to identify the pre-stored third image from the set of pre-stored second images, based on the determined similarity metric. The identification of the pre-stored third image is described further, for example, in FIG. 3 (at 314).

At 420, a display device (such as the display device 210) may be controlled to display information associated with the identified pre-stored third image. In one or more embodiments, the circuitry 202 may be configured to control the display device 210 to display the information associated with the identified pre-stored third image. The control of the display device 210 is described further, for example, in FIG. 3 (at 314). Control may pass to end.

Although the flowchart 400 is illustrated as discrete operations, such as 404, 406, 408, 410, 412, 416, 418, and 420 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer (such as an electronic device 102). The instructions may cause the machine and/or computer to perform operations that include reception of a first image (such as the first image 302A). The operations may further include extraction, by a Deep Neural Network (DNN) model (such as the DNN model 108), of a first set of image features (such as the first set of image features 304A) associated with the received first image 302A. The operations may further include generation of a first feature vector associated with the received first image 302A, based on the extracted first set of image features 304A. The operations may further include extraction, by an image-feature detection model (such as the image-feature detection model 110), of a second set of image features (such as the second set of image features 306A) associated with the received first image 302A. The operations may further include generation of a second feature vector associated with the received first image 302A, based on the extracted second set of image features 304A. The operations may further include generation of a third feature vector associated with the received first image 302A, based on a combination of the generated first feature vector and the generated second feature vector. The operations may further include determination of a similarity metric between the generated third feature vector associated with the received first image and a fourth feature vector of each of a set of pre-stored second images. The operations may further include identification of a pre-stored third image from the set of pre-stored second images based on the determined similarity metric. The operations may further include control of a display device (such as the display device 210) to display information associated with the identified pre-stored third image.

Exemplary aspects of the disclosure may provide an electronic device (such as the electronic device 102 of FIG. 1) that includes circuitry (such as the circuitry 202). The circuitry 202 may be configured to receive a first image 302A. The circuitry 202 may be configured to extract, by a Deep Neural Network (DNN) model 108, a first set of image features (such as, the first set of image features 304A) associated with the received first image 302A. The circuitry 202 may be configured to generate a first feature vector associated with the received first image 302A, based on the extracted first set of image features 304A. The circuitry 202 may be configured to extract, by an image-feature detection model 110, a second set of image features (such as, the second set of image features 306A) associated with the received first image 302A. The circuitry 202 may be configured to generate a second feature vector associated with the received first image 302A, based on the extracted second set of image features 306A. The circuitry 202 may be configured to generate a third feature vector associated with the received first image 302A, based on a combination of the generated first feature vector and the generated second feature vector. The circuitry 202 may be configured to determine a similarity metric between the generated third feature vector associated with the received first image 302A and a fourth feature vector of each of a set of pre-stored second images. The circuitry 202 may be configured to identify a pre-stored third image from the set of pre-stored second images, based on the determined similarity metric. The circuitry 202 may be configured to control a display device 210 to display information associated with the identified pre-stored third image.

In accordance with an embodiment, the image-feature detection model 110 may include at least one of, but not limited to, a Scale-Invariant Feature Transform (SIFT)-based model, a Speeded-Up Robust Features (SURF)-based model, an Oriented FAST and Rotated BRIEF (ORB)-based model, or a Fast Library for Approximate Nearest Neighbors (FLANN)-based model.

In accordance with an embodiment, the generation of the third feature vector may be further based on an application of a Principal Component Analysis (PCA) transformation on the combination of the generated first feature vector and the generated second feature vector. In accordance with an embodiment, the similarity metric may include at least one of, but not limited to, a cosine-distance similarity or a Euclidean-distance similarity.

In accordance with an embodiment, the circuitry 202 may be further configured to determine, by a machine learning model (such as, the machine learning model 316) different from the DNN model 108 and the image-feature detection model 110, a first weight associated with the generated first feature vector and a second weight associated with the generated second feature vector. The circuitry 202 may be further configured to combine the generated first feature vector and the generated second feature vector, based on the determined first weight and the determined second weight. The circuitry 202 may be configured to generate the third feature vector based on the combination of the generated first feature vector and the generated second feature vector.

In accordance with an embodiment, the circuitry 202 may be further configured to receive a user input including a first weight associated with the generated first feature vector and including a second weight associated with the generated second feature vector. The circuitry 202 may be further configured to combine the generated first feature vector and the generated second feature vector based on the received user input. The circuitry 202 may be configured to generate the third feature vector based on the combination of the generated first feature vector and the generated second feature vector.

In accordance with an embodiment, the circuitry 202 may be further configured to classify, by the DNN model 108, the received first image 302A into a first image tag from a set of image tags associated with the DNN model 108. The circuitry 202 may be configured to determine a first count of images, associated with the first image tag, in a training dataset (such as, the training dataset 112) associated with the DNN model 108. The circuitry 202 may be further configured to determine a first weight associated with the generated first feature vector and a second weight associated with the generated second feature vector based on the determined first count of images associated with the first image tag. The circuitry 202 may be further configured to combine the generated first feature vector and the generated second feature vector based on the determined first weight and the determined second weight. The circuitry 202 may be configured to generate the third feature vector based on the combination of the generated first feature vector and the generated second feature vector.

In accordance with an embodiment, the circuitry 202 may be configured to determine an image quality score associated with the received first image 302A based on at least one of the extracted first set of image features 304A or the extracted second set of image features 306A. The circuitry 202 may be further configured to determine a first weight associated with the generated first feature vector and a second weight associated with the generated second feature vector based on the determined image quality score. The circuitry 202 may be further configured to combine the generated first feature vector and the generated second feature vector based on the determined first weight and the determined second weight. The circuitry 202 may be configured to generate the third feature vector based on the combination of the generated first feature vector and the generated second feature vector. In accordance with an embodiment, the image quality score may correspond to at least one of, but not limited to, a sharpness, a noise, a dynamic range, a tone reproduction, a contrast, a color saturation, a distortion, a vignetting, an exposure accuracy, a chromatic aberration, a lens flare, a color moire, or artifacts associated with the received first image 302A.

In accordance with an embodiment, the circuitry 202 may be further configured to extract the first image 302A from a first video and the identified pre-stored third image that may correspond to a pre-stored second video. The pre-stored second video may be associated with the first video.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
circuitry configured to:
  receive a first image;
  extract, by a Deep Neural Network (DNN) model, a first set of image features associated with the received first image;
  generate a first feature vector associated with the received first image based on the extracted first set of image features;
  extract, by an image-feature detection model, a second set of image features associated with the received first image;
  generate a second feature vector associated with the received first image based on the extracted second set of image features;
  determine, based on a resolution of the received first image, each of:
    a first weight associated with the generated first feature vector, and
    a second weight associated with the generated second feature vector;
  combine the generated first feature vector and the generated second feature vector based on the determined first weight and the determined second weight;
  generate a third feature vector associated with the received first image based on the combination of the generated first feature vector and the generated second feature vector;
  determine a similarity metric between the generated third feature vector associated with the received first image and a fourth feature vector of each of a set of pre-stored second images;
  identify a pre-stored third image from the set of pre-stored second images based on the determined similarity metric; and
  control a display device to display information associated with the identified pre-stored third image.

2. The electronic device according to claim 1, wherein the image-feature detection model comprises at least one of a Scale-Invariant Feature Transform (SIFT)-based model, a Speeded-Up Robust Features (SURF)-based model, an Oriented FAST and Rotated BRIEF (ORB)-based model, or a Fast Library for Approximate Nearest Neighbors (FLANN)-based model.

3. The electronic device according to claim 1, wherein the generation of the third feature vector is further based on an application of a Principal Component Analysis (PCA) transformation on the combination of the generated first feature vector and the generated second feature vector.

4. The electronic device according to claim 1, wherein the similarity metric comprises at least one of a cosine-distance similarity or a Euclidean-distance similarity.

5. The electronic device according to claim 1, wherein the circuitry is further configured to determine, by a machine learning model different from the DNN model and the image-feature detection model, the first weight associated with the generated first feature vector and the second weight associated with the generated second feature vector.

6. The electronic device according to claim 1, wherein the circuitry is further configured to:

receive a user input including the first weight associated with the generated first feature vector and including the second weight associated with the generated second feature vector;

combine the generated first feature vector and the generated second feature vector based on the received user input; and generate the third feature vector based on the combination of the generated first feature vector and the generated second feature vector.

7. The electronic device according to claim 1, wherein the circuitry is further configured to:

classify, by the DNN model, the received first image into a first image tag from a set of image tags associated with the DNN model;

determine a first count of images, associated with the first image tag, in a training dataset associated with the DNN model;

determine the first weight associated with the generated first feature vector and the second weight associated with the generated second feature vector based on the determined first count of images associated with the first image tag;

combine the generated first feature vector and the generated second feature vector based on the determined first weight and the determined second weight; and generate the third feature vector based on the combination of the generated first feature vector and the generated second feature vector.

8. The electronic device according to claim 1, wherein the circuitry is further configured to:

determine an image quality score associated with the received first image based on at least one of the extracted first set of image features or the extracted second set of image features;

determine the first weight associated with the generated first feature vector and the second weight associated with the generated second feature vector based on the determined image quality score;

combine the generated first feature vector and the generated second feature vector based on the determined first weight and the determined second weight; and generate the third feature vector based on the combination of the generated first feature vector and the generated second feature vector.

9. The electronic device according to claim 8, wherein the image quality score corresponds to at least one of a sharpness, a noise, a dynamic range, a tone reproduction, a contrast, a color saturation, a distortion, a vignetting, an exposure accuracy, a chromatic aberration, a lens flare, a color moire, or artifacts associated with the received first image.

10. The electronic device according to claim 1, wherein the circuitry is further configured to extract the first image from a first video and the identified pre-stored third image that corresponds to a pre-stored second video, and wherein the pre-stored second video is associated with the first video.

11. A method, comprising:

in an electronic device:
receiving a first image;
extracting, by a Deep Neural Network (DNN) model, a first set of image features associated with the received first image;
generating a first feature vector associated with the received first image based on the extracted first set of image features;
extracting, by an image-feature detection model, a second set of image features associated with the received first image;
generating a second feature vector associated with the received first image based on the extracted second set of image features;
determining, based on a resolution of the received first image, each of:
 a first weight associated with the generated first feature vector, and
 a second weight associated with the generated second feature vector;
combining the generated first feature vector and the generated second feature vector based on the determined first weight and the determined second weight;
generating a third feature vector associated with the received first image based on the combination of the generated first feature vector and the generated second feature vector;
determining a similarity metric between the generated third feature vector associated with the received first image and a fourth feature vector of each of a set of pre-stored second images;
identifying a pre-stored third image from the set of pre-stored second images based on the determined similarity metric; and
controlling a display device to display information associated with the identified pre-stored third image.

12. The method according to claim 11, wherein the image-feature detection model comprises at least one of a Scale-Invariant Feature Transform (SIFT)-based model, a Speeded-Up Robust Features (SURF)-based model, an Oriented FAST and Rotated BRIEF (ORB)-based model, or a Fast Library for Approximate Nearest Neighbors (FLANN)-based model.

13. The method according to claim 11, wherein the generation of the third feature vector is further based on an application of a Principal Component Analysis (PCA) transformation on the combination of the generated first feature vector and the generated second feature vector.

14. The method according to claim 11, wherein the similarity metric comprises at least one of a cosine-distance similarity or a Euclidean-distance similarity.

15. The method according to claim 11, further comprising determining, by a machine learning model different from the DNN model and the image-feature detection model, the first weight associated with the generated first feature vector and the second weight associated with the generated second feature vector.

16. The method according to claim 11, further comprising:

receiving a user input including the first weight associated with the generated first feature vector and the second weight associated with the generated second feature vector;

combining the generated first feature vector and the generated second feature vector based on the received user input; and generating the third feature vector based on the combination of the generated first feature vector and the generated second feature vector.

17. The method according to claim 11, further comprising:

classifying, by the DNN model, the received first image into a first image tag from a set of image tags associated with the DNN model;

determining a first count of images, associated with the first image tag, in a training dataset associated with the DNN model;

determining the first weight associated with the generated first feature vector and the second weight associated with the generated second feature vector based on the determined first count of images associated with the first image tag;

combining the generated first feature vector and the generated second feature vector based on the determined first weight and the determined second weight; and generating the third feature vector based on the combination of the generated first feature vector and the generated second feature vector.

18. The method according to claim 11, further comprising:

determining an image quality score associated with the received first image based on at least one of the extracted first set of image features or the extracted second set of image features;

determining the first weight associated with the generated first feature vector and the second weight associated with the generated second feature vector based on the determined image quality score;

combining the generated first feature vector and the generated second feature vector based on the determined first weight and the determined second weight; and generate the third feature vector based on the combination of the generated first feature vector and the generated second feature vector.

19. The method according to claim 18, wherein the image quality score corresponds to at least one of a sharpness, a noise, a dynamic range, a tone reproduction, a contrast, a color saturation, a distortion, a vignetting, an exposure accuracy, a chromatic aberration, a lens flare, a color moire, or artifacts associated with the received first image.

20. A non-transitory computer-readable medium having stored thereon, computer-executable instructions that when executed by an electronic device, causes the electronic device to execute operations, the operations comprising:

receiving a first image;

extracting, by a Deep Neural Network (DNN) model, a first set of image features associated with the received first image;

generating a first feature vector associated with the received first image based on the extracted first set of image features;

extracting, by an image-feature detection model, a second set of image features associated with the received first image;

generating a second feature vector associated with the received first image based on the extracted second set of image features;

determining, based on a resolution of the received first image, each of:
 a first weight associated with the generated first feature vector, and
 a second weight associated with the generated second feature vector;

combining the generated first feature vector and the generated second feature vector based on the determined first weight and the determined second weight;

generating a third feature vector associated with the received first image based on the combination of the generated first feature vector and the generated second feature vector;

determining a similarity metric between the generated third feature vector associated with the received first image and a fourth feature vector of each of a set of pre-stored second images;

identifying a pre-stored third image from the set of pre-stored second images based on the determined similarity metric; and controlling a display device to display information associated with the identified pre-stored third image.

\* \* \* \* \*